United States Patent [19]
Margaria et al.

[11] Patent Number: 5,352,271
[45] Date of Patent: Oct. 4, 1994

[54] COMPOSITE WIRE WITH A PLASTIC SHEATH FOR ADDITIONS TO METALLIC BATHS

[75] Inventors: Thomas Margaria; Michel Rebiere, both of Passy, France

[73] Assignee: Pechiney Electrometallurgie, Courbevoie, France

[21] Appl. No.: 21,090

[22] Filed: Feb. 24, 1993

[30] Foreign Application Priority Data

Mar. 5, 1992 [FR] France .............................. 92 02867

[51] Int. Cl.$^5$ ............................................ C21C 7/02
[52] U.S. Cl. ..................................... 75/526; 75/772
[58] Field of Search ............................... 75/526, 772

[56] References Cited

U.S. PATENT DOCUMENTS

| | | | |
|---|---|---|---|
| 3,841,616 | 10/1974 | Rocher | 75/526 |
| 4,088,478 | 5/1978 | Hetke et al. | 75/772 |
| 4,159,906 | 7/1979 | Meichsner et al. | 75/772 |

FOREIGN PATENT DOCUMENTS

| | | |
|---|---|---|
| 32874 | 7/1981 | European Pat. Off. . |
| 2260622 | 9/1975 | France . |
| 665852 | 6/1988 | Switzerland . |
| 79/00536 | 8/1979 | World Int. Prop. O. . |

*Primary Examiner*—Peter D. Rosenberg
*Attorney, Agent, or Firm*—Dennison, Meserole, Pollack & Scheiner

[57] ABSTRACT

A method for producing a composite wire for addition of solid products to metal baths in which the core comprises the addition products and a sheath of plastic material covers the core. The wire is produced by a coextrusion of the core and the sheath. The core comprises a mixture of a powder of addition product and a thermoplastic polymer powder, while the sheath comprises a thermoplastic polymer powder which can be the same as the thermoplastic of the core.

10 Claims, 1 Drawing Sheet

COMPOSITE WIRE WITH A PLASTIC SHEATH FOR ADDITIONS TO METALLIC BATHS

BACKGROUND OF THE INVENTION

The technical sphere of the invention relates to composite wires comprising a continuous cylindrical sheath and a core consisting of an addition product.

Secondary metallurgy or refining metallurgy carried out on molten metal in a ladle often necessitates the addition of solid products to the metallic baths. The method involving a cored wire with a metallic sheath, usually of iron, which is gradually introduced into the bath is known for its great flexibility and its performance: the introduction of the addition products into and not over the molten bath minimises the losses by volatilisation and by oxidation, leading to high, constant material yields.

However, the wire core with a metallic sheath has two drawbacks: its high cost and its relatively slow dissolution in a bath of cast iron of which the temperature is lower than 1450° C.

The inventors have posed themselves the problem of finding a substitute for cored wires with a steel sheath which is less expensive and does not have the disadvantages of these wires of slow dissolution in baths of molten metal.

The invention relates primarily to composite wires for the addition of solid products to metallic baths of which the core consists essentially of these addition products and the sheath of plastics material.

The invention relates secondarily to a process for producing these composite wires.

DESCRIPTION OF RELATED ART

It is known to introduce treatment additives to a bath of molten metal by means of cored wires of which the core consists of these additives and the covering of a continuous metal sheath.

This method is illustrated, in particular, in French Patent No. 2 392 120 (Metal Research Corporation) and in European Patent No. 0 141 760 (Vallourec).

U.S. Pat. No. 4,163,827 (Caterpillar Tractor Co.) following from Application No. WO 79 00536 describes a process for producing a tubular wire for inoculation which involves extruding a core composed of a mixture of the treatment agent and a binder and winding an external protective ribbon in a spiral round this extruded core. This ribbon is preferably a metallic sheet: steel, aluminium, copper or titanium. It may also be an organic material such as plastic or fibrous paper.

European Patent Application No. EP 0 032 874 (Arbed S. A.) describes a cored wire comprising a metallic sheath consisting of a thin strip, an additive enclosed inside the sheath, the additive being surrounded by a covering of synthetic or metallic material in the form of a strip which has a thickness of less than 100 micrometers and produces a seal. The description mentions a few examples of synthetic materials: polyethylene, polyesters or polyvinylchloride. Swiss Patent No. CH 665 852 describes a process for adding reagents to a bath of metal in which the reagent in powdered form is enclosed in a flexible tube which is emptied into the metallic bath. The flexible tube is made either of plastics material or of fibrous material such as cellulose.

SUMMARY OF THE INVENTION

On reading the prior art documents, it will be seen that the obtaining of these composite wires is confronted by two types of problem: the impermeability of the sheath and the cohesion and homogeneity of the core. In the Application No. WO 79 00536, impermeability is achieved either by means of a partial overlap of the successive turns or by means of two helical windings which are superimposed at two different angles. The homogeneity of the core is achieved by extrusion of the addition product mixed with a binder. In European Patent Application No. EP 0 032 874, impermeability is achieved with a double covering of which the plastic interior can either be stuck on the external covering or is heat-shrinkable. In Swiss Patent No. CH 655 852, impermeability is achieved easily by using a flexible tube but the filling of this tube with a mixture of powders without binder obviously poses problems of cohesion and homogeneity.

The inventors have found that it was possible to produce composite wires of which the core consists of the treatment agent to be introduced into the liquid metal mixed with a binder and of which the external sheath consists of polymer by simultaneous extrusion or co-extrusion of the core and of the sheath which therefore consists of a continuous seamless tube. The problems of impermeability, cohesion and homogeneity are therefore solved well, particularly if the binder and the polymer of the sheath are identical. A method employed in the remote sphere of the sheathing of electrical cables is used for this co-extrusion process.

For this purpose, the treatment agent is intimately mixed with a powdered thermoplastic polymer, for example polyethylene. The quantity of polymer to be used is preferably between 2 and 30% of the total weight of the mixture. The composite wire is then produced by co-extrusion with a sheath of thermoplastic polymer, for example polyethylene, which forms the external covering of a continuous composite wire which is to be wound directly at the outlet of the die.

DESCRIPTION OF THE PREFERRED EMBODIMENTS

Figure 1:
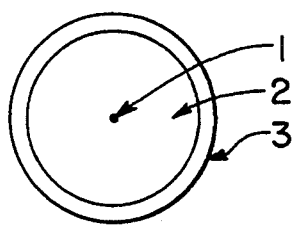
FIG. 1 is a cross-sectional view of a wire according to the invention.

As shown in FIG. 1, it is possible to improve the tensile strength of the composite wire produced in this way by immersing a continuous metallic wire in the centre of the core of the composite wire during the extrusion process. A wire obtained utilizing a continuous metallic wire in the core comprises three portions: the central reinforcing wire (1), the core core consisting of the reactive mixture bound by a thermoplastic polymer, for example polyethylene, (2) and the external sheath of polymer (3).

Figure 2:
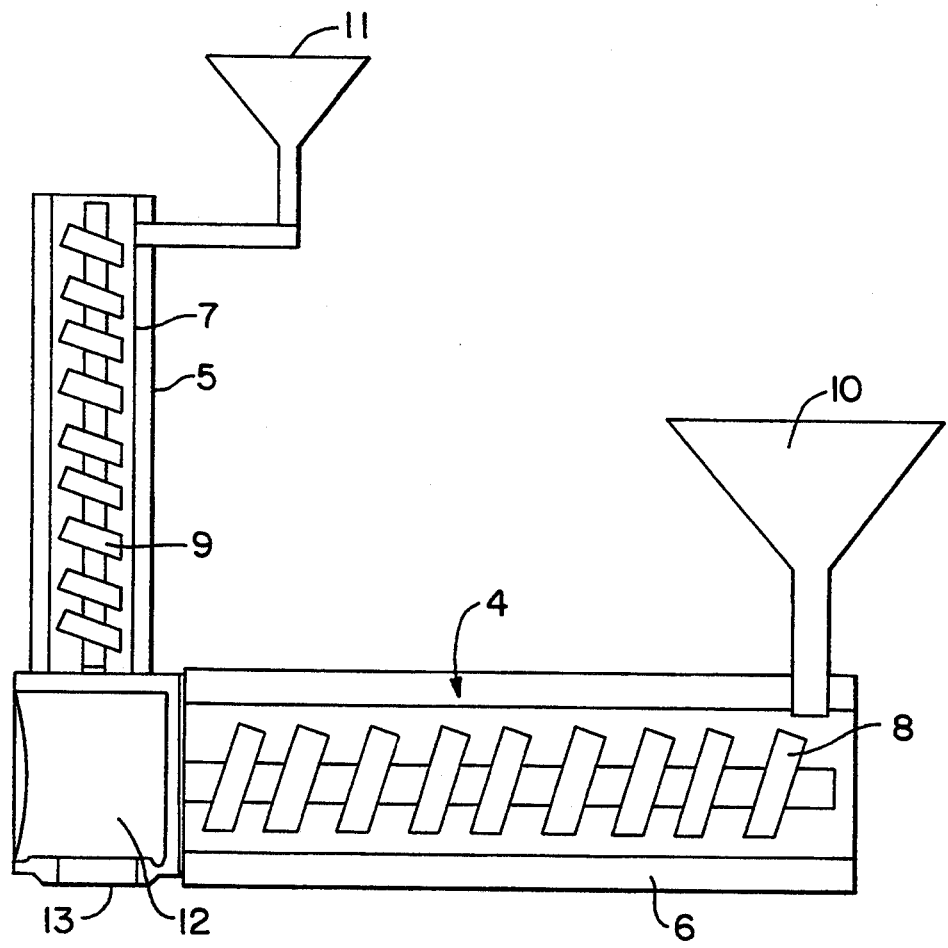
FIG. 2 is a schematic diagram in cross-section of an apparatus for producing a wire according to the invention.

Co-extrusion is carried out in a known manner, for example using an apparatus similar to that used for the co-extrusion of sheathed cables and of which the principle is shown in FIG. 2. The apparatus consists of a combination of two extruders (4) and (5) each essentially comprising a hollow tube or sleeve (6) and (7) which may be heated by means (not shown), a central worm (8) and (9) and a hopper for supplying the product to be extruded (10) and (11). These two extruders are arranged at right angles and are connected by a crosshead (12) equipped with a die (13) constituting the outlet of the extruder. The crosshead also comprises, in a known manner, means (not shown) for guiding the possible central wire and distribution channels for the polymer intended for the sheath. The hopper (10) is supplied with a powdered mixture of reactive product, for example magnesium, calcium carbide, and of thermoplastic polymer, the hopper (11) solely of thermoplastic polymer intended for the production of the sheath.

The two methods for carrying out the invention described above are extremely advantageous for the producer, in particular in the sphere of safety. During the production process, the staff is never in contact with the addition products of which the reactivity may be dangerous. These products are stored in silos kept under an inert atmosphere, for example nitrogen, and are transferred by gravity into the feed hopper of the extruder which also kept under inert gas. The agglomerated product mixed with the plastics material is much more chemically inert and may be cut up or coiled in the open air.

The products obtained by carrying out the invention also have a great advantage for the user. In comparison with the addition product in granular form, these composite wires with an addition product and plastic sheathed with plastic have three advantages:

1. They gradually liberate the addition product as the plastics material of the core forms a thermal barrier between the grains. The reaction between the addition product and the bath is therefore much less violent, reducing the losses and therefore improving the yield.

2. They allow the use of more finely divided addition products with a greater specific surface area which are therefore more reactive. The presence of plastics material mixed with the reagent does in fact allow a gradual reaction as just mentioned.

3. The release of the gases of decomposition of the plastics material contained allows better dispersion of the addition product in the bath. Performance comparable to that of injection of micronized addition products is thus achieved.

The composite wire having a plastic sheath has two advantages over the cored wire with a steel sheath:

1. It is less expensive.
2. It dissolves more rapidly in molten metals treated at relatively low temperatures (lower than 1450° C.). This slow dissolution of the cored wire is one of the obstacles to the use of a cored wire for additions to molten metals frequently treated at low temperature.

The industrial applications of the products according to the invention concern all the technical spheres in which it is necessary to introduce a solid reagent into a bath of molten metal. These include the desulphurisation of pig iron for steel making or for foundries, the nodulisation and inoculation of foundry pig iron.

The desulphurisation of pig iron, whether for steel making or for foundries, intended in particular for the production of articles made of cast iron containing spheroidal graphite aims to reduce the sulphur content to 0.005 to 0.10%.

The majority of desulphurising agents are based on two alkaline earths: magnesium and calcium which readily combine with sulphur to give sulphides while forming slag which is insoluble in the cast iron. The excess magnesium is eliminated owing to its high vapour tension at the treatment temperature, and the excess calcium carbide in the form of slag. Thus, metallic magnesium, calcium carbonate, lime, diamide lime (mixture of Ca carbonate and carbon) and calcium carbide are used separately or in combination with possible additions of products intended to improve the pourability of the desulphurising mixture or to release gases allowing a good distribution of the desulphurising agent in the liquid cast iron. In fact, these desulphurising agents are usually injected by means of a lance in suspension in an inert carrier gas.

One of the applications of the invention is a process for the production of composite wires of which the core consists of agglomerated fine magnesium and/or calcium carbide powders and the sheath of a plastics material.

The invention therefore proposes an alternative to products based on calcium carbide and/or magnesium which are injected by a lance by allowing totally safe use of products having a finer grain size.

However, the products produced according to the invention have been found to be equally well adapted to nodulisation and inoculation of foundry pig iron. The nodulisation of cast iron involves forming a spheroidal graphite, also known as nodular graphite, from the carbon present in the cast iron which substantially improves their elongation at break and therefore their deformability. This treatment is carried out by the addition of different elements to the cast iron: magnesium, cerium, rare earths and/or their alloys. The majority of these elements used in the pure state and in solid form would react too violently, leading to losses of metal and a poor yield. Therefore they are usually used in dilute form. Thus, a ferro-silico-magnesium (FeSiMg) introduced, for example, in the form of a cored wire having a FeSiMg core and a steel sheath, is commonly used as a source of magnesium.

The inoculation of cast iron involves introducing into the cast iron elements which promote the nucleation of the graphite to the detriment of the cementite (iron carbide), embrittling the cast iron. These elements are alkalis or alkaline earths (calcium) or bismuth alloyed with silicon.

These treatments are carried out in sequence: desulphurisation, nodulisation, inoculation. The last two have relatively transient effectiveness owing to the volatility of the added elements. Therefore they are frequently carried out belatedly a short while before the casting of the articles while the metal is at a fairly low temperature.

The inventors have found that the use of a composite wire of which the core consists of the above-mentioned nodulising or inoculating elements, a mixture thereof or of one or more of their alloys and of thermoplastic material and of which the sheath is of thermoplastic material was very suitable for these applications: nodulisation, inoculation or combination of both treatments. In fact, the high speed of dissolution of these wires allows a belated, low temperature treatment of the baths of cast iron. Furthermore the cost of the operation is low as the plastic sheathed composite wire is less expensive.

EXAMPLES

Example 1: Desulphurisation by Magnesium

The results of desulphurisation of a single cast iron have been compared using, on the one hand, grains of 0.250 to 2 mm and, on the other hand, a composite wire having an external diameter of 16 mm consisting of a polyethylene sheath having a thickness of 0.5 mm and a core composed of a mixture containing 90% by weight of magnesium powder having dimensions smaller than 200 micrometres and 10% by weight of polyethylene.

The quantity of active product, that is of magnesium, used was 1.2 kg/tonne of cast iron in each case.

A very violent reaction was observed with the granular magnesium whereas the reaction was calm with the composite wire.

The desulphurisation results were as follows:

| | |
|---|---|
| Initial sulphur in the cast iron: | 0.06% |
| Final sulphur - granular magnesium: | 0.025% |
| Final sulphur - composite wire: | 0.015% |

Example 2: Desulphurisation by calcium carbide

The desulphurisation results of the same cast iron were compared using, on the one hand, calcium carbide in grains of 0.200 to 2 mm and, on the other hand, a composite wire having an external diameter of 10 mm consisting of a polyethylene sheath having a thickness of 0.5 mm and a core composed of a mixture containing 80% by weight of calcium carbide powder having dimensions smaller than 100 micrometers and 10% by weight of polyethylene.

The quantity of active product, that is of calcium carbide, used was 3 kg/tonne of cast iron in each case.

A very calm reaction was observed in both cases.

The desulphurisation results were as follows:

| | |
|---|---|
| Initial sulphur in the cast iron: | 0.06% |
| Final sulphur - granular carbide: | 0.055% |
| Final sulphur - composite wire: | 0.020% |

Example 3: Desulphurisation by Calcium Carbide

The desulphurisation results of the same cast iron were compared using, on the one hand, a composite wire having an external diameter of 10 mm consisting of a sheath of polyethylene with a thickness of 0.5 mm and a core composed of a mixture containing 90% by weight of calcium carbide powder with dimensions smaller than 100 micrometers and 10% by weight of polyethylene and containing in its centre an axial iron wire having a diameter of 1 mm, on the other hand a cored wire having the same external diameter and consisting of a steel sheath with a thickness of 0.5 mm and a core of the same composition.

The quantity of active product, that is of calcium carbide, required to reduce the sulphur content of the cast iron from its initial content of 0.06% to a final value of 0.010% was determined.

The results were as follows:

| | |
|---|---|
| Cored wire steel sheath: | 3.8 kg/tonne of cast iron |
| Composite wire plastic sheath: | 3.2 kg/tonne of cast iron |

Example 4: Nodulisation of the Cast Iron by the Composite Wire with a Magnesium-Containing Plastic Sheath The results of nodulisation of the same cast iron were compared using, on the one hand, a composite wire with an external diameter of 10 mm consisting of a polyethylene sheath with a thickness of 0.5 mm and a core composed of a mixture containing 90% by weight of magnesium powder having dimensions smaller than 200 micrometers and 10% by weight of polyethylene, on the other hand a cored wire having an external diameter of 10 mm consisting of a steel sheath with a thickness of 0.5 mm and a core consisting of 90% of ferro-silico-magnesium and 10% of magnesium. These two wires contained the same quantity of magnesium per linear meter.

Spheroidisation tests were carried out in a slender ladle containing cast iron at 1450° C.

During several series of tests carried out until spheroidisation was complete (100% of spheroidal graphite), the magnesium yield $R_{Mg}\%$ was compared, that is the ratio of the quantity of magnesium present in the cast iron after completion of treatment to the introduced quantity.

The results are as follows:

| | |
|---|---|
| With the cored steel wire: | $46\% < R_{Mg} < 61\%$ |
| With the composite plastic wire: | $55\% < R_{Mg} < 67\%$ |

Example 5: Belated Inoculation of Grey Cast Iron

The inoculation results of the same cast iron composed of:

| | |
|---|---|
| C = | 3.25% |
| Si = | 2% |
| Mn = | 0.4% |
| S = | 0.1% | were compared using the same commercial inoculating alloy based on ferro-silicon containing alkaline earths. This inoculating agent assumed three different forms:

on the one hand granulates of alloy introduced into the jet of liquid cast iron, on the other hand a composite wire with an external diameter of 5 mm consisting of a polyethylene sheath with a thickness of 0.25 mm and a core composed of a mixture containing 90% by weight of inoculating alloy powder and 10% by weight of polyethylene, produced by coextrusion, and finally a conventional cored wire having an external diameter of 5 mm consisting of a steel sheath with a thickness of 0.5 mm and a core consisting of 90% of the same inoculating alloy powder.

Inoculation was carried out at low temperature: 1300° to 1350° C.

The quantities of inoculating agent required for obtaining an identical degree of inoculation were compared, characterised by the standard test of depth of tempering. The results were:

0.15% of the weight of cast iron with conventional jet inoculation;

0.15% also with composite plastic wire inoculation ineffective treatment owing to the difficulty in dissolving the steel sheath with inoculation of conventional cored wire.

What is claimed is:

1. Process for producing a composite wire for the introduction of addition product into a liquid metal bath, comprising the steps of:
    forming a mixture containing 70–98% by weight of a powder of addition product, and 2–30% by weight of a thermoplastic polymer powder;
    extruding the mixture in the form of a continuous product of circular or elliptical cross-section;
    coextruding a thermoplastic sheath around the continuous product; and
    extracting the product of extrusion as a continuous wire.

2. Process for producing composite wire according to claim 1, wherein the thermoplastic polymer powder and the thermoplastic sheath are formed of the same polymer.

3. Process for producing composite wire according to claim 2, wherein the thermoplastic polymer powder and the thermoplastic polymer of the sheath are both polyethylene.

4. Process for producing composite wire according to claims 1 or 3, additionally comprising introducing a metal wire continuously into the center of the core during extrusion.

5. Process for producing composite wire according to claims 1 or 3, wherein the addition product mixed with the polymer powder is calcium carbide.

6. Process for producing composite wire according to claims 1 or 3, wherein the addition product mixed with the polymer powder is magnesium.

7. Process for producing composite wire according to claims 1 or 3, wherein the addition product mixed with the polymer powder comprises a mixture of calcium carbide and magnesium powders.

8. Process for producing composite wire according to claims 1 or 3, wherein the addition product mixed with the polymer powder comprises a mixture of powders of one or more nodulising elements selected from the group consisting of magnesium, cerium, rare earth metals and alloys thereof.

9. Process for producing composite wire according to claims 1 or 3, wherein the addition product mixed with the polymer powder comprises a mixture of powders of one or more innoculating elements selected from the group consisting of alkali and alkaline earth metals, and bismuth alloyed with silicon.

10. Process for producing composite wire according to claim 8, wherein the addition product mixed with the polymer powder comprises a mixture of powders of one or more nodulising elements and one or more inoculating elements.

* * * * *